(12) United States Patent
Partridge (10) Patent No.: US 11,019,811 B2
(45) Date of Patent: Jun. 1, 2021

(54) FISHING LURE

(76) Inventor: Stephen Partridge, Spanish Fork, UT (US)

( * ) Notice: Subject to any disclaimer, the term of this patent is extended or adjusted under 35 U.S.C. 154(b) by 47 days.

(21) Appl. No.: 12/715,519

(22) Filed: Mar. 2, 2010

(65) Prior Publication Data

US 2011/0214332 A1 Sep. 8, 2011

(51) Int. Cl.
*A01K 85/01* (2006.01)
*A01K 85/00* (2006.01)

(52) U.S. Cl.
CPC ............. *A01K 85/00* (2013.01); *A01K 85/01* (2013.01)

(58) Field of Classification Search
CPC ................................. A01K 85/01; A01K 85/00
USPC ......................... 43/42.24, 42.28, 42.06, 42.09
See application file for complete search history.

(56) References Cited

U.S. PATENT DOCUMENTS

| | | | | |
|---|---|---|---|---|
| 1,249,194 A * | 12/1917 | Race | ............................ | 43/42.06 |
| 1,612,264 A * | 12/1926 | Cressey | ....................... | 43/42.28 |
| 2,102,739 A * | 12/1937 | Peters | .......................... | 43/42.24 |
| 2,129,245 A * | 9/1938 | Stenstrom | ..................... | 43/42.06 |
| 2,218,280 A * | 10/1940 | Deering | ........................ | 43/42.26 |
| 2,532,879 A * | 12/1950 | Baker | ..................... | A01K 85/16 |
| | | | | 43/42.06 |
| 2,674,058 A * | 4/1954 | Lindenberg | ................... | 43/42.06 |
| 2,686,382 A * | 8/1954 | Fisher | ..................... | A01K 85/00 |
| | | | | 43/42.28 |
| 2,753,651 A * | 7/1956 | Fisher | ...................... | B29C 41/14 |
| | | | | 264/78 |
| 2,817,922 A * | 12/1957 | Takeshita | ..................... | 43/42.28 |
| 2,827,376 A * | 3/1958 | Breuer | .......................... | 43/42.06 |
| 2,869,279 A * | 1/1959 | Pretorius | ....................... | 43/42.06 |
| 2,922,246 A * | 1/1960 | Mileschuk | ..................... | 43/42.06 |
| 3,017,716 A * | 1/1962 | Hawks | .......................... | 43/42.24 |
| 3,047,975 A * | 8/1962 | Pretorius | ....................... | 43/42.06 |
| 3,108,389 A * | 10/1963 | McGuire | ............... | A01K 85/00 |
| | | | | 43/42.06 |
| 3,120,074 A * | 2/1964 | Messler | ....................... | 43/42.28 |
| 3,403,466 A * | 10/1968 | Young | .................. | A01K 97/045 |
| | | | | 43/4 |
| 3,426,467 A * | 2/1969 | Bryant | ................... | A01K 85/00 |
| | | | | 43/42.28 |
| 3,828,463 A * | 8/1974 | Perrin | .......................... | 43/42.28 |
| 3,835,572 A * | 9/1974 | Mounsey | ................ | A01K 85/16 |
| | | | | 43/42.06 |

(Continued)

FOREIGN PATENT DOCUMENTS

| | | | | |
|---|---|---|---|---|
| CA | 2174359 A1 * | 10/1997 | ............. | A01K 85/01 |
| FR | 2782895 A1 * | 3/2000 | ............. | A01K 85/01 |

(Continued)

*Primary Examiner* — Darren W Ark
(74) *Attorney, Agent, or Firm* — Kunzler Bean & Adamson, PC (57) ABSTRACT

An artificial fishing lure that has a sleeve extending over the lure to create a water resistant cavity. Wherein the sleeve is made to elastically constrict around at least the head to hold the sleeve thereto. The sleeve may have a diving lip mounted to the front to regulate the depth of the lure while being pulled through the water. The sleeve may have at least one appendage mounted thereto. The cavity may be used to place fish scent attractant material, weights, air or other desirable material therein. At least one hole may be mounted through the circumscribing wall in a location juxtaposing the cavity. The sleeve may also contain at least one partition positioned in the cavity.

18 Claims, 3 Drawing Sheets

(56) References Cited

U.S. PATENT DOCUMENTS

| | | | | |
|---|---|---|---|---|
| 3,854,233 A * | 12/1974 | Browning, III | ........ | A01K 85/00 43/42.29 |
| 3,914,895 A * | 10/1975 | Mize | ...................... | A01K 85/00 43/42.05 |
| 3,969,840 A * | 7/1976 | Charron | ...................... | 43/42.06 |
| 3,971,152 A * | 7/1976 | Husson, Jr. | .................. | 43/42.06 |
| 3,987,575 A * | 10/1976 | Morita | ........................ | 43/42.06 |
| 3,991,504 A * | 11/1976 | Pieper | ......................... | 43/42.06 |
| 4,023,300 A * | 5/1977 | Vieths | .......................... | 43/41.2 |
| 4,060,925 A * | 12/1977 | Bias | .............................. | 43/41.2 |
| 4,133,134 A * | 1/1979 | Cheng | .................... | A01K 85/10 43/42.06 |
| 4,158,927 A * | 6/1979 | Capra et al. | ................. | 43/42.28 |
| 4,197,667 A * | 4/1980 | Helfenstine et al. | ........ | 43/42.06 |
| 4,214,397 A * | 7/1980 | Kent | ............................ | 43/42.28 |
| 4,242,827 A * | 1/1981 | Smith | .......................... | 43/42.24 |
| 4,257,182 A * | 3/1981 | Thom | ......................... | 43/42.06 |
| 4,267,658 A * | 5/1981 | Brown | .................. | A01K 97/02 43/42.06 |
| 4,638,586 A * | 1/1987 | Hall | ............................. | 43/42.28 |
| 4,653,212 A * | 3/1987 | Pixton | .................... | A01K 85/00 43/4.5 |
| 4,689,914 A * | 9/1987 | Quinlan | ....................... | 43/42.22 |
| 4,726,138 A * | 2/1988 | Hurt | ...................... | A01K 97/04 43/4.5 |
| 4,741,120 A * | 5/1988 | Cota et al. | .................... | 43/17.6 |
| 4,790,100 A * | 12/1988 | Green, Sr. | .................... | 43/42.28 |
| 4,799,329 A * | 1/1989 | Paulsen | .................. | A01K 85/00 43/42.25 |
| 4,831,768 A * | 5/1989 | Sorace | .................... | A01K 85/00 43/42.05 |
| 4,843,754 A * | 7/1989 | Spelts | ......................... | 43/42.28 |
| 4,893,431 A * | 1/1990 | Ehlers | ......................... | 43/42.47 |
| 4,907,364 A * | 3/1990 | Hedman | .................. | A01K 85/00 43/42.39 |
| 4,914,851 A * | 4/1990 | Acker | ..................... | A01K 85/02 43/42.05 |
| 4,942,689 A * | 7/1990 | Link | ...................... | A01K 95/00 43/42.24 |
| 4,956,934 A * | 9/1990 | Dahl | ............................ | 43/42.31 |
| 5,025,586 A * | 6/1991 | Pixton | .................... | A01K 85/00 43/42.24 |
| 5,113,606 A * | 5/1992 | Rinker | .................... | A01K 85/10 43/42.06 |
| 5,134,801 A * | 8/1992 | Davey | ......................... | 43/42.06 |
| 5,142,811 A * | 9/1992 | Freeman | ................ | A01K 85/00 43/42.06 |
| 5,172,510 A * | 12/1992 | Lovell, Jr. | .............. | A01K 85/01 43/42.06 |
| 5,299,378 A * | 4/1994 | Ballard | ....................... | 43/42.06 |
| 5,301,453 A * | 4/1994 | Terrill | .................... | A01K 85/00 43/42.09 |
| 5,333,405 A * | 8/1994 | Bowles | ....................... | 43/42.06 |
| 5,335,441 A * | 8/1994 | Blackwell | .............. | A01K 85/00 43/42.36 |
| 5,377,442 A * | 1/1995 | Gariglio | ................. | A01K 83/06 43/44.2 |
| 5,471,780 A * | 12/1995 | Hopson | .................. | A01K 85/01 43/42.06 |
| 5,517,781 A * | 5/1996 | Paoletta, Jr. | ................. | 43/42.06 |
| 5,533,296 A * | 7/1996 | Jansen | .................. | A01K 85/00 43/42.05 |
| 5,535,540 A * | 7/1996 | Crumrine | ............... | A01K 85/00 43/42.09 |
| 5,595,015 A * | 1/1997 | Jensen | .................... | A01K 85/01 43/42.06 |
| 5,630,289 A * | 5/1997 | Dotson | ........................ | 43/42.09 |
| 5,667,739 A * | 9/1997 | Kato | ...................... | A01K 85/00 264/138 |
| 5,689,910 A * | 11/1997 | Kato | ............................ | 43/42.28 |
| 5,725,892 A * | 3/1998 | Gibbs | ......................... | 43/42.06 |
| 6,061,948 A * | 5/2000 | Boucek | .................. | A01K 85/00 43/42.09 |
| 6,192,616 B1 * | 2/2001 | Kent | ............................ | 43/42.06 |
| 6,205,697 B1 * | 3/2001 | Kent | ...................... | A01K 85/01 264/246 |
| 6,233,863 B1 * | 5/2001 | Dotson | ........................ | 43/42.09 |
| 6,266,916 B1 * | 7/2001 | Dugan | .................. | A01K 85/00 43/42.06 |
| 6,301,823 B1 * | 10/2001 | Monticello | ............ | A01K 85/14 43/42.09 |
| 6,393,757 B2 * | 5/2002 | Bomann | ................ | A01K 85/00 43/42.09 |
| 6,598,336 B2 * | 7/2003 | Link | ............................ | 43/42.28 |
| 6,651,376 B1 * | 11/2003 | Link | ............................ | 43/42.09 |
| 6,675,525 B1 * | 1/2004 | Ford | ............................ | 43/42.06 |
| 6,779,293 B1 * | 8/2004 | Rice | ...................... | A01K 85/01 43/42.06 |
| 6,912,808 B1 * | 7/2005 | Mak | ............................ | 43/42.28 |
| 7,076,911 B2 * | 7/2006 | Thorne | ....................... | 43/42.28 |
| 7,234,267 B1 * | 6/2007 | Konstant | ............... | A01K 85/01 43/42.24 |
| 7,263,798 B2 * | 9/2007 | Nichols | .................. | A01K 85/18 43/42.09 |
| 7,497,046 B1 * | 3/2009 | Jefferson | ............... | A01K 85/00 43/42.24 |
| 8,079,173 B2 * | 12/2011 | Corbitt, III | ............ | A01K 85/00 43/42.36 |
| 8,381,429 B2 * | 2/2013 | Greene | .................. | A01K 85/00 43/42.25 |
| 8,640,378 B2 * | 2/2014 | Rye | ........................ | A01K 85/01 43/42.09 |
| 8,745,916 B1 * | 6/2014 | Rutty | ..................... | A01K 85/01 43/42.35 |
| 8,813,418 B2 * | 8/2014 | Sundstrom | ............. | A01K 85/01 43/42.06 |
| 2003/0159328 A1 * | 8/2003 | Acker | ..................... | A01K 85/00 43/42.37 |
| 2008/0127542 A1 * | 6/2008 | Young | ......................... | 43/42.24 |
| 2008/0155883 A1 * | 7/2008 | Corbitt | ........................ | 43/42.28 |
| 2008/0313948 A1 * | 12/2008 | Lewis | ......................... | 43/42.24 |
| 2009/0056196 A1 * | 3/2009 | Korteweg | .................... | 43/42.28 |
| 2009/0119971 A1 * | 5/2009 | Miyasato et al. | ............ | 43/42.24 |
| 2009/0265975 A1 * | 10/2009 | Gibson | ........................ | 43/42.24 |
| 2009/0307960 A1 * | 12/2009 | Oelerich et al. | ............. | 43/42.24 |
| 2018/0027786 A1 * | 2/2018 | Baggett | ................... | A01K 85/00 |

FOREIGN PATENT DOCUMENTS

| | | | | |
|---|---|---|---|---|
| FR | 3063205 A1 * | 8/2018 | ............. | A01K 85/00 |
| GB | 1401796 A * | 7/1975 | ............. | A01K 85/16 |
| GB | 2470559 A * | 12/2010 | ............. | A01K 85/01 |
| JP | H0543860 U * | 6/1993 | | |
| JP | 10313734 A * | 12/1998 | | |
| JP | 2001045919 A * | 2/2001 | | |
| JP | 2004166672 A * | 6/2004 | | |
| JP | 2009278953 A * | 12/2009 | | |
| WO | WO-2016010437 A1 * | 1/2016 | ............. | A01K 85/01 |

* cited by examiner

FISHING LURE

BACKGROUND OF THE INVENTION

Field of the Invention

The present invention relates to fishing lures, specifically to fishing lures having at least a replicable second layer.

Description of the Related Art

In the related art, it has been known to use fishing lures in the sport of fishing. There have been hundreds of popular designs and thousands of inventions related to the evolution in the art of enticing fish to strike a lure and reward fisherman with a memorable experience in eventually landing the prize catch of a life time. Many improvements have been made in the fishing lure field. Examples of references related to the present invention are described below, and the supported teachings of each reference are incorporated by reference herein:

U.S. Pat. No. 5,689,910, discloses an artificial bait that can provide a great effect to attract fish by light emission or reflection from air bubbles contained in the artificial bait. A large number of air bubbles are enclosed within the bait body that is formed of elastic material having flexibility and light transmissible property within the air bubbles may be deformed to enhance the attractiveness of the bait.

U.S. Pat. No. 5,333,405, describes a soft plastic fishing lure containing particulate microencapsulated liquid fish attractant. Characteristically the soft plastic component of the fishing lure is the major component and is a heavily plasticized vinyl plastisol. Incorporated (blended) with this vinyl plastisol is a minor component containing particulate discrete microencapsulated particles (individual microcapsules), each having a spherical cell wall of a water-soluble gradually dissolving natural or synthetic coacervated polymer and an internal phase of liquid fish attractant, and agglomerates of such individual microcapsules associated in a tacky, viscous, continuous, substantially water-soluble polymeric binder. The predominant portion of individual microcapsules range in particle size from about five microns to about 100 microns, and whose mean individual particle size ranges from about thirty to about seventy microns.

U.S. Pat. No. 4,956,934, discloses an artificial fishing lure is described having a hollow transparent body formed from transparent plastic. Within the body is a sealed compartment containing an anti-freezing liquid in which is suspended a multiplicity of small reflective flakes that shimmer when the lure is pulled through the water to attract fish.

U.S. Pat. No. 2,827,376, issued Apr. 28, 1955, describes a combined edible bait and chum comprising a luring mixture or chum, for example menhaden oil and bread crumbs, encapsulated with soft gelatin or gelatinoid to form a single unit adapted to establish a practical local relationship between the visual lure and the chum.

U.S. Pat. No. 3,971,152, describes a molded, elastomeric fishing lure having an internal cavity for retaining a fish-attracting olfactory agent such as freeze-dried squid pellets, and including one or more openings into said cavity at the forward end for the ingress of water, and one-way insertion and retaining means at the aft end, where the pellet may be inserted, and which allows for egress of water. In a preferred embodiment, the lure has the general shape of a squid and locks at the forward end onto a head piece having an integral hook which extends through the lure into the leg section, the head piece including bendable, laterally-extending diving planes.

U.S. Pat. No. 2,129,245, issued in 1937, describes a fishing lure made of sponge rubber in the shape of a minnow adapted to permit a hook to be thrust into the mouth and through the gills.

U.S. Pat. No. 5,517,781, issued in 1996, describes a worm lure for dispensing a scented fluid to attract fish. The inventive device includes a worm body having a center fluid reservoir extending there through for receiving a supply of scented fluid. A plurality of lateral reservoirs communicates with the center fluid reservoir to dispense the scented fluid through a plurality of apertures in the worm body. The worm body is constructed of a resilient material such that a fish bite will compress the center fluid reservoir to dispense the scented fluid there from through the apertures. Further, the worm body is shaped so as to define a plurality of arcuate contours over which the surrounding water is accelerated to draw the scented fluid in small amounts from the apertures through the venturi effect.

U.S. Pat. No. 5,725,892, issued in 1998, describes a mold utilized for creating a fishing worm having an abdominal cavity that contains an attractant gel having a stimulating taste to a fish, the mold having first and second sections, with each section having a cavity portion. Each cavity portion of the mold represents a part of a desired worm configuration, with the cavity portion of one mold section being able to be brought into careful alignment with the cavity portion of the other mold section, after which molten plastic can be injected into the completed mold cavity constituted by the aligned cavity portions of the first and second mold sections. An elongate plug held in place by a small diameter supporting member is mounted in a mid portion of the cavity of the first mold section, at a position corresponding to the abdominal region of the worm to be created. Thus, upon molten plastic being inserted into the completed mold cavity, a plastic worm will be defined, with such worm having an abdominal cavity resulting from the utilization of the elongate plug. The small diameter supporting member causes a hole to be made in the sidewall of each plastic worm so created, through which the attractant gel having a pleasant taste to a fish can thereafter be injected.

U.S. Pat. No. 6,675,525, issued in 2004, describes a disposable, buoyant, scented fishing lure is formed of a soft, resilient, economically disposable plastic material, with a hollow chamber formed within the lure body. A fish attractant scent material and flotation element is placed within the lure body chamber. The float may be coated or otherwise treated with the scent material prior to installation within the lure, to install the scent material therein. The chamber, with the scent material and float installed therein, is then hermetically sealed to prevent escape of the scent there from. When the lure is to be used, the angler installs a fish hook therein and penetrates the scent and float chamber with the hook. This allows the scent material to be released gradually from the lure through the passages formed by the hook insertion in the lure. Once the scent material has substantially dissipated, the angler may discard the used lure for a fresh one.

The inventions heretofore known suffer from a number of disadvantages. The prior art does not allow for the size adjustment of scent reservoirs on the existing fishing lures. Also, there is no size adjustment of air pockets on lures to regulate the buoyancy thereof. Moreover, there is no known means of changing the coloration of the lure in a simple fashion. Additionally, there is no known method of covering a leaded jig head with soft flexible material, when the jig head is positioned in front of, for example, a tube lure, or plastic worm.

What is needed is a soft flexible cover or sleeve that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available fishing lure technology.

Accordingly, the present invention has been developed to provide a disposable, buoyant, scented fishing lure that is formed of a soft, resilient, economically disposable plastic material, with a hollow chamber that can be formed in front of the lure body.

The present invention may also provide for the size adjustment of the scent reservoirs on the existing fishing lure.

Also, the present invention may provide for a size adjustment of an air pocket on the lure to regulate the buoyancy thereof.

Moreover, the present invention may provide for a means of changing the coloration of the lure by replacing the resilient sleeve that fits over the base fishing lure in a simple fashion.

Additionally, the present invention may provide for a method of covering a leaded jig head with the soft, flexible material sleeve or cover, when the jig head is positioned in front of, for example, a tube lure, or plastic worm.

A fish attractant scent material and flotation element are placed within the lure body chamber. The float may be coated or otherwise treated with the scent material prior to installation within the lure, to install the scent material therein. The chamber, with the scent material and float installed therein, is then hermetically sealed to prevent escape of the scent there from. When the lure is to be used, the angler installs a fish hook therein and penetrates the scent and float chamber with the hook. This allows the scent material to be released gradually from the lure through the passages formed by the hook insertion in the lure. Once the scent material has substantially dissipated, the angler may discard the used lure for a fresh one. . . .

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment as innumerated in this section. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example," a "feature" or similar language means that the particular structure, characteristic, element or combinations thereof may be included in at least one embodiment of the present invention. Additionally, reference to this wording does not mean that the element is essential to the invention as claimed, and the element may be an optional element to the invention. The specification is provided to describe potential elements that may be found in the claims, and that the claims stand as reciting what is and is not essential to the invention, and not the specification. The features, functions, and the like described herein are considered to be able to be combined in whole or in part, one with another, as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. All of these terms are to be interpreted as including the more restrictive terms "consisting of" and "consisting essentially of."

It is understood that the described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
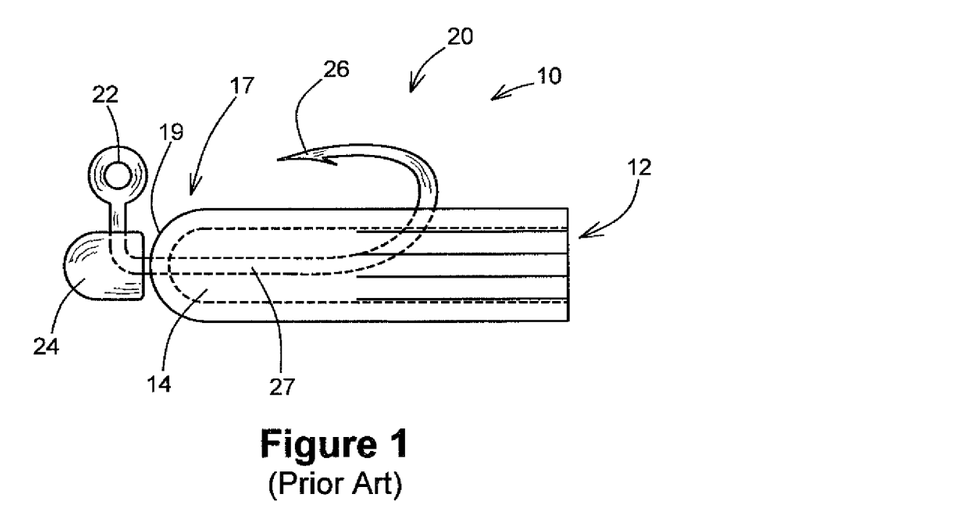
FIG. 1 illustrates a side view of a prior art fishing tube lure with a lead head hook.
Figure 2:
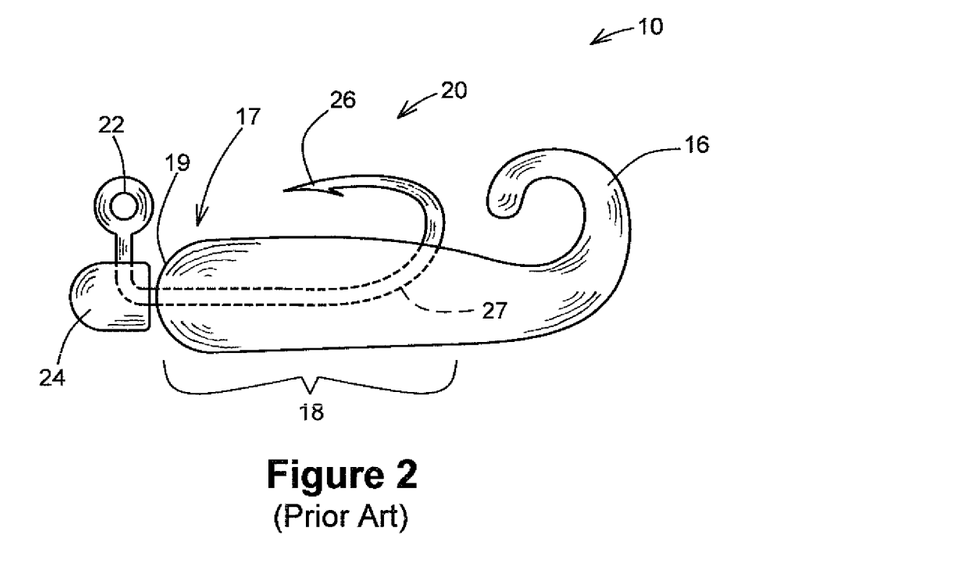
FIG. 2 illustrates a side view of a prior art solid body twist tail lure with a lead head hook.
Figure 3:
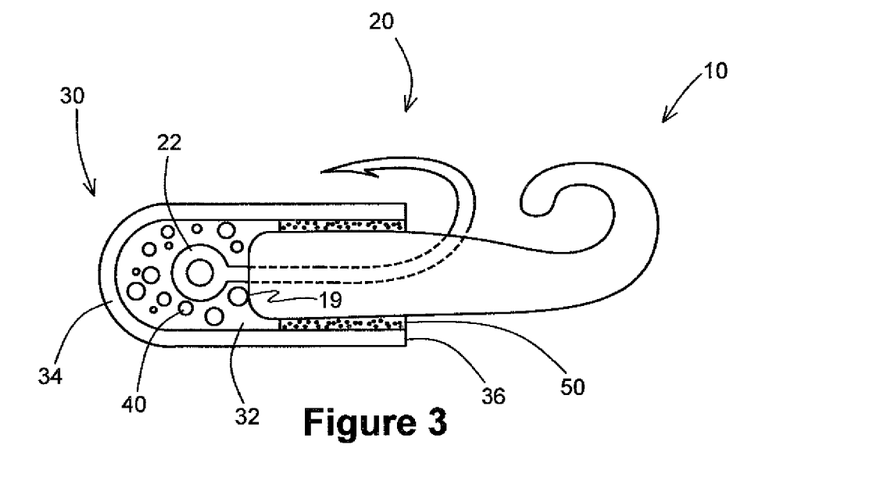
FIG. 3 illustrates a side view of a solid body twist tail lure with a non- lead head hook and sleeve mounted thereon.
Figure 4:
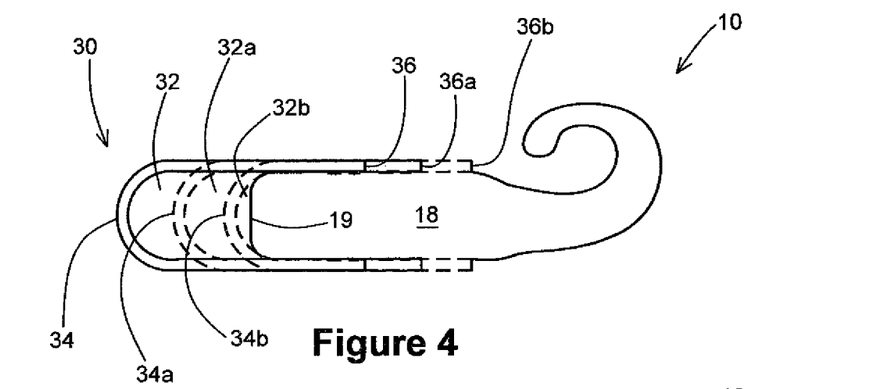
FIG. 4 illustrates a side view of a lure body with a sleeve mounted in optional positions.
Figure 5:
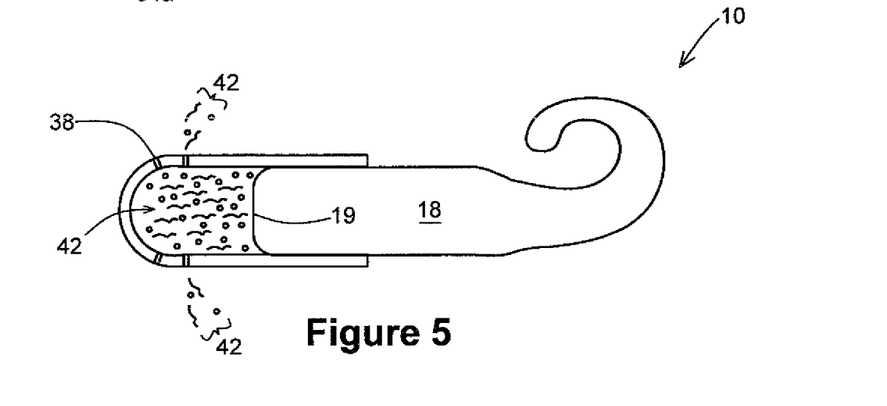
FIG. 5 illustrates a side view of a lure body with a vented sleeve with fish scent located in the cavity.
Figure 6:
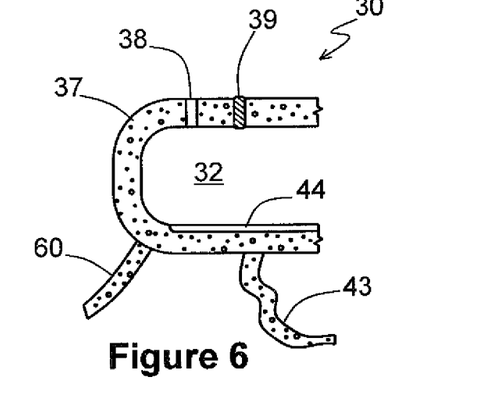
FIG. 6 illustrates a partial cross-sectional side view of the sleeve with plugged holes and a groove.
Figure 7:
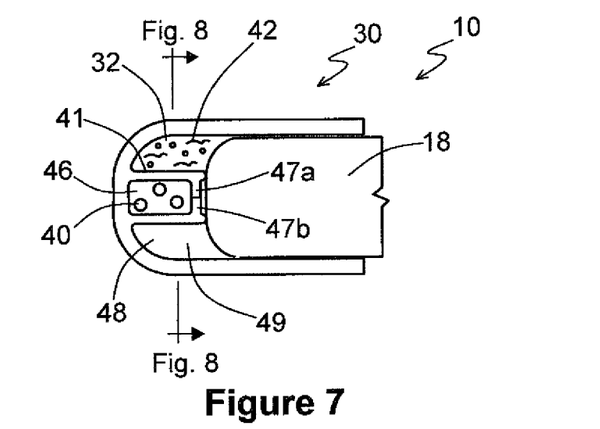
FIG. 7 illustrates a side view of a segmented cavity in the sleeve while mounted over the lure.
Figure 8:
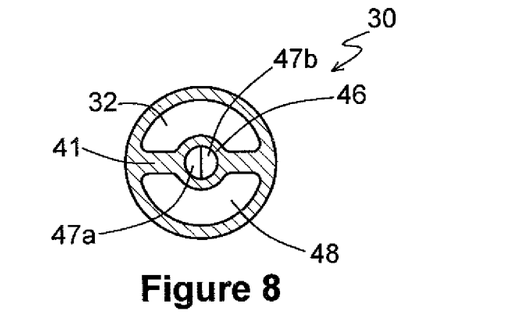
FIG. 8 illustrates a cross-sectional front view of the sleeve of FIG. 7.

The following description of elements is provided to assist one skilled in the art to understand the various embodiments of the illustrated core invention and its variations and embodiments. As shown in prior art FIGS. 1 and 2, there is a fishing lure 10, fringe skirt 12, lure cavity 14, twist tail 16, lure head 17, lure shank (body) 18, front edge 19 of the lure head, hook 20, eye 22, lead head 24, hook barb 26, and hook shank 27.

Pertaining to the remaining FIGS. 3-8, there is illustrated the various features of the core present invention and all its variations that may be part of the core invention as determined by the claims appended herein. It is noted that, for ease of description, reference is made to a lure 10 and a sleeve 30, indicating that they are two separate elements. However, for claiming purposes, these two items are referred to as making up an entire "lure" in the claims.

There is illustrated a representative artificial fishing lure 10 with one type of hook 20, not having a lead head, though one skilled in the art would easily understand how a lead head hook would mount within a cavity 32. A sleeve 30 is mounted over the lure body 18, in a way that may create a cavity 32. The sleeve 30 includes a head or front section 34 and a circumscribing wall that extends away from the front section. The cavity 32 is designed that it may include lead heads 24, weighted shots 40, scent or food particles 42, or just air 49. A liquid 50, like glue or lubricant, may be placed over the lure 10 and under the sleeve 30 as illustrated. The cavity may be adjusted to form different size cavities 32, 32a and 32b respectively. The different cavity sizes are created by having the lure front surface 19 in a different position relative to the sleeve head 34, 34a and 34b respectively. The back end 36, 36a and 36b of the sleeve, respectively, is likewise in a different position as the sleeve is adjusted to create the desired sized cavity. The cavity may be enlarged to contain a lead head 24 or hook eye 22, or it may be eliminated as shown in cavity 32b. The sleeve may also include holes 38 or grooves 44 to assist in the release of fish scents or the like from the cavity. Additionally, removable plugs 30 may be used to prevent movement of contained materials across the sleeve wall 37. The sleeve may also contain one or more partitions 41 to provide for multiple similar or dissimilar items to be located in the overall cavity. For example, in one embodiment, there is a partition arrangement that creates a central circular cavity 46 that has door flaps 47a and 47b, and two additional cavities 48 and 32 positioned around the circular cavity 46. Whereby, the scent 42 may be placed in cavity 32, weighted shot 40 may be in cavity 46 and held in place by the openable flaps 47a and b, and air 49 may be maintained in cavity 48. The partition 41 may be shorter than the length of the sleeve to allow room enough for the lure 10 to be held in place by the sleeve section not having a partition.

Various Embodiments and Discussion

In one embodiment, the head portion 17 of the lure may be shaped so as to emulate any of a multitude of creature head shapes or alternatively may have a generally hemispherical and/or conic shape. Surfaces of the lure or sleeve may converge into a point and/or edge so as to emulate a mouth-type portion of a creature's head. The sleeve or lure may have appendages 43 coupled thereto to emulate tentacles, fins, proboscises and/or any other appendage that may be used to attract fish thereto.

The sleeve and/or lure may be composed of a compliant material having a surface finish that may emulate an exterior of any of a variety of creatures which may be suitable as fish bait. The lure and/or sleeve may be any color and/or combination of colors. Additionally, the sleeve and lure body components may have different hues, color gradients, brightness, brightness gradients, iridescence, and/or reflectivity properties. The reflectivity properties may be caused by metal flecks and/or plastic flecks with reflective coatings; where such flecks are disposed interior to and/or within the body component wall so as to be visible from the outside thereof. The sleeve is in the shape of a regular tube with one end closed, called the front section or head, and the other end of the tube being open. In other words, the sleeve looks like a straight sock for a foot of a person, and fits over a fishing lure like a sock fits over a person's foot. However, in the present invention, there is a cavity between the toe of the sock and the tip of the toes of the person.

In another embodiment, there may be a plurality of apertures disposed through the cavity creating portion of the sleeve, to allow the water to flow there through. Moreover, the apertures may allow the scent of scented materials 42 to exude through the head portion.

Yet, another embodiment envisions that the cavity 32 may have any shape, like square, lead head conforming, bullet shape, etc., and not just the illustrated generally hemispherical tubular shape. It is noted that the diameter of the sleeve may be the same as the diameter of the head of the lure or the body. It may be smaller in some designs also, or it could be larger in other designs. Alternatively, the cavity may have a single or multiple dividing walls 41 therein to create one or more additional chambers. It is even conceivable to include one or more lids 47a and 47b to each chamber. The chambers allow multiple objects and/or substances to be disposed therein, like weights, scents, or air. One skilled in the art would easily understand that the objects and/or substances may be disposed in the chambers to cause certain hydrodynamic properties and/or attraction properties.

As shown, in this embodiment, the sleeve portion 30 is illustrated as having a generally tubular shape, which is slidably fitted onto the illustrated tubular shaped lure head portion opposite the tail portion. The sleeve is axially aligned with the lure head portion, as illustrated. The sleeve may have a consistent cross-sectional shape or wall 37 from one end to another. Desirable variations would having the cross-section wall thickness vary over the length of the lure, like, a tapered lengthwise cross-section or a minimum-maximum- minimum diameter lengthwise cross-section, and variations thereof. The sleeve may have most any desirable shape, like a fish body with fins, or a bulging section. It is even envisioned to have a lip diving spoon section 60 like the well known design used in hard fish lures, like the well known RAPALA® diving lures. The lip diving spoon section 60 is designed to control the lure diving in depth of the water while the lure is being pulled through the water.

In other embodiments, the sleeve exterior surface finish may or may not be consistent with the lure head exterior surface finish. The sleeve surface finish may emulate any of a variety of aquatic creatures' exterior surface characteristics. Additionally, the sleeve may be composed of a compliant material like any polymer based or rubbery material commonly known in the art. The sleeve size and interior shape may be selected to frictionally fit, and elastically contract onto the lure body. Thus, the sleeve would be, at least in part of its surface, having an inside diameter that is smaller than the outside diameter of the lure body.

The sleeve wall 37, in one embodiment, is generally made of a non-porous material, and is impervious to water moving through the material from the outside to the inside surface thereof. Thus, this design enables the creation of an air pocket in the cavity that will be maintained throughout the use of the lure during fishing.

In an alternative embodiment, to facilitate the movement of fish attractant material and scents, as illustrated in another embodiment, holes are generally placed in the walls of the sleeve. These holes may be located just in the head region of the sleeve or throughout the entire surface of the sleeve. The head region is where the fish scent would be located, and thus holes would not be needed in the rest of the sleeve. The rest of the sleeve is generally designed to elastically constrict about the body of the lure and thus holes are not needed. Although, one skilled in the art will recognize that holes may be located along the entire length of the sleeve.

In another embodiment, the size area of the holes created in the wall of the sleeve, would not be larger then the wall size area. In other words, there would be more wall area on the sleeve then the area covered by the holes. Too many holes would not keep the scent material in the cavity long enough. Since the too many or too large holes would very quickly expel the valuable scent material or not contain the small weighted shots therein sufficiently to be of use to the practice of the illustrated fully assembled fishing lure with sleeve. Specifically, the scent is best used by having a slow release of the scent over time, and over multiple casts of the lure. Thus, allowing the same lure set up to be used over many casts by the fisherman. If the scent were released too quickly, the lure would have to be re- injected with scent every single cast, which is not desirable.

As discussed, it is also another embodiment to optionally create holes that have removable plugs located therein. Thus, allowing the user the option to keep the sleeve wall resistant to the free flow of water, and such, through the wall, in one instance. Yet, in another instance, by removing all or some of the plugs, the free flow of contents in the cavity is enabled. It is envisioned to have the plugs frictionally fit therein so that a simple squeezing of the sleeve around the plug would make it possible to pop out that plug.

As illustrated in this embodiment, the cavity may include a plurality of pellets therein. The plurality of pellets may be placed into the different chambers which may be fowled by the plurality of partitions. The plurality of pellets may all be the same size. Alternatively, the pellets may vary in size and shape and each may be designated to have certain desirable mass properties. The desirable mass properties may include being a certain mass so that an fisherman may choose, based on the mass thereof, which pellets to place within the body component and which pellets to leave out based on the hydrodynamic properties of the fishing lure the angler desires. The plurality of pellets may be coupled together to form a combination of pellets able to be disposed in the cavity portion of the body component. Combinations of pellets composed of different densities may be coupled together so as to change the hydrodynamic properties of the fishing lure. The pellets may be hollow, further enhancing the hydrodynamic properties of the fishing lure.

As illustrated in an embodiment, there are different particles of matter which may attract fish to the fishing lure. The particles or contents (not being particles) may be liquids, oils, dissolvable solids, such as salts, which all may be disposed in the cavity portion. The particles may emulate the scent of a certain species of creature so that it may entice a fish to consume the fishing lure. Known fish attractant chemicals may include but are not limited to insect and/or fish pheromones, blood, and/or human food such as cheese, peanut butter, butter, candy, salts and/or other spices.

The fishing lure and sleeve combination, in one embodiment, may be impregnated in the walls or body thereof with chemicals which are attractive to one or more species of fish. Again, such commonly consider fish attractant chemicals may include but are not limited to insect and/or fish pheromones, blood, and/or human food such as cheese, peanut butter, butter, candy, salts and/or other spices.

The first tail portion, in one embodiment, is coupled to an end portion of the shank or body portion. The first tail portion may be substantially flat, so as to be thin enough that the tail portion may vacillate side to side when the fishing lure is pulled through water. The first tail portion may have a greater thickness near where it couples to the shank portion 18 and may taper to a lesser thickness at an opposite end thereof. The first tail portion may have a surface finish thereon which emulates scales and/or other exterior structural characteristics of creatures which may be desirable for fish to consume. The first tail component may have a wavy and/or helical configuration which may be for aesthetic and/or hydrodynamic properties. Additionally, there may be a second tail portion, a third tail portion and/or any number of tail portions coupled to the shank portion. Each tail portion may be substantially similar to other tail portions. Alternatively, each tail portion may be different than all other tail portions. Each tail portion may be coupled to the shank member in a different orientation than other tail portions coupled thereto. Differences in tail portions may include but are not limited to different color, shape, material, size, elasticity, flexibility, scent, and/or surface finish.

As shown, in an embodiment, the hook may have most any known hook shape and design used in the art of fishing. As known in the prior art, there may be leaded head portions added to the area of the loop portion (eye) 22, which often are located just in front of the head portion of the body of the hire when mounted thereon. The barb of the hook component is configured to penetrate the tail component so that the lure may be positioned onto a portion of the hook component or hook shank 27. The loop (eye) 22 portion of the hook component is configured so that a fishing line may be coupled thereto.

In yet another embodiment, the lure is in most any shape or style. It is illustrated to use a soft bodied lure. However, it is also possible to use a hard bodied lure, like a rapala®, or any other type of lure not illustrated.

In design of another embodiment, the back end, opposite the head 34, of the sleeve is illustrated as being cut straight across with no shape, like that of a mouth of a jar or pail. However, it is envisioned to have the end of the sleeve be most any known shape. For example, the end may have a skirt appearance, it may have extending claws, it could have extending long tails, etc.

In operation of one embodiment of the invention, a user may select a desired lure and a hook and secure the hook to the selected lure by pushing the barb of the hook into a portion of the shank portion of the tail component so that the barb penetrates and travels in a linear path centrally through the shank portion then causes the barb to emerge from the shank portion 18 while the eye or loop 22 extends from the lure body at the other end of the lure body 17. Thereby, a user places a sleeve 30 over the hook eye, and leaded weight if present, thus creating the cavity. The lead head hook design would require the eye 22 to be extended through the sleeve wall 27 while maintaining the lead head within the cavity. However, in one design, the lead head may also be outside the cavity 32b, when the cavity is much smaller or non-existent.

As discussed above, in one embodiment, the user may select what to place within the cavity. Or, the user may place nothing but air to create extra lure buoyancy. The user may place at least one or more pellets into the cavity portion to increase the weight of the lure. However, the user may place weight pellets on the side of the lure body by wedging them between the lure body and the sleeve in an arrangements that causes the lure to tilt either downward, upward and/or to one side or the other, to achieve desired hydrodynamic characteristics.

In one additional embodiment, a user may place scent oils, foods, chum and/or other material in the cavity portion to enhance the scent attractive properties of the lure. In the case of scents, the scent would ooze out the side of the lure under the sleeve as the cavity is dragged through the water and hits structure under water causing ejection of the scent material. It is noted that lateral parallel grooves 44, extending along the inside surface of the sleeve from the cavity to the end of the sleeve, could assist in the ejection of the scent from the cavity to the outside.

As discussed, the user may, in an embodiment, place a lubrication layer or a glue layer on the lure body by placing lubricating oil or glue onto an exterior of the shank portion (body) before placing the sleeve thereover. The lubrication oil (which could also be a fish scented oil or even chum) is to facilitate easier assembly of the sleeve onto the lure body component. Of course, the applied glue is designed to secure the sleeve in place to prevent slippage or movement of the sleeve over the lure body when in use.

It is well known that a user may attach the fishing line to the eye of the hook. This can be done by extending the line through the head portion of the sleeve and attaching it to the eye if the eye is located in the cavity. Otherwise, the line is attached in a regular fashion to the eye when it extends through the sleeve and is located outside the sleeve.

It is understood that the above described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, it is envisioned that the properties of each portion and component of the present invention may vary in many ways including but not limited to size, shape, color, luminescent features, scent, hydrodynamic properties, density, flexibility, and/or materials. A further example is that the colors and scent of components may be configured to emulate certain creatures. Additionally, the hydrodynamic properties may vary so as to emulate certain aquatic locomotion characteristics and/or to compensate for certain hydrological conditions that may exist at a desired fishing location.

Additionally, although the figures illustrate a one tail lure, it is envisioned that any known fishing lure may be used, both hard and soft, just so the sleeve fists over the lure. It is also envisioned that the type of hook components 20 may vary greatly. For example, the hook may have multiple barbs. Additionally, the hook may be a jig-head hook, wherein the jig-head may be disposed interior to the head portion and the loop portion of the hook component extrudes through an aperture in the head portion of the sleeve.

Finally, it is envisioned that the material of the sleeve may be constructed of a variety of materials, which may include but not be limited to plastics such as poly ethylene, poly propylene, nylon, nitrile, silicone, latex, and/or polyurethane; and/or metals such as steel, copper, tin, nickel, silver, brass, and/or aluminum; and/or organic materials such as wood, plants, oils and/or fluids from animals and/or plants, worms, grubs, larvae and/or other whole and/or partial aquatic and/or avian animals and/or insects; and/or various ceramic materials.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to, consist of, or to consist essentially of one or more of the features, functions, structures, methods described herein.

What is desired to be claimed under Letters Patent is as follows:

1. An artificial fishing lure, comprising:
   an artificial head, rear, and body mounted therebetween, the head being integral with the rear and the body;
   a sleeve being a separate element and removable from the artificial head, rear, and body, the sleeve having a front and a circumscribing wall extending therefrom to form an opening, the wall extending extendable over the head to create a cavity between the front and head in response to the sleeve being removably mounted over the head using the opening, and at least one hole through the circumscribing wall at a location that allows communication between the cavity and an environment exterior of the sleeve, wherein, in response to the sleeve being mounted over the head:
   the sleeve elastically constricts around at least the head to hold the sleeve thereto with a removable friction fit between the head and the wall within the opening such that the body and the rear extend outwardly from the opening of the sleeve in a direction away from the front of the sleeve;

a scent material is dynamically inserted by a user between the sleeve and the head into the cavity; and the scent material is gradually released from under the elastically constricted sleeve.

2. The artificial fishing lure of claim 1, wherein the sleeve wall is impervious to liquid passing therethrough.

3. The artificial fishing lure of claim 1, wherein the sleeve wall is a contiguous water resistant solid sheet of material that prevents water from entering the cavity thereof.

4. The artificial fishing lure of claim 1, wherein the cavity has a same diameter as the head.

5. The artificial fishing lure of claim 1, wherein the cavity has a different diameter as the head.

6. The artificial fishing lure of claim 1, wherein the sleeve includes a diving lip mounted to the front to help regulate the depth of the lure while being pulled through the water.

7. The artificial fishing lure of claim 1, wherein the sleeve includes at least one appendage mounted thereto.

8. The artificial fishing lure of claim 1, wherein the sleeve includes a divided skirt design mounted opposite the front thereof.

9. The artificial fishing lure of claim 1, further comprising a hook, with an eye and a barb, and mounted to the fishing lure in a position that allows a fish to be impaled on the hook and retained by the barb.

10. The artificial fishing lure of claim 9, wherein the hook comprises a lead head that is positioned within the cavity and the eye extends through the wall of the sleeve.

11. The artificial fishing lure of claim 1, wherein the scent material further comprising fish scent attractant material mounted within the cavity.

12. The artificial fishing lure of claim 1, further comprising a weight material mounted within the cavity.

13. The artificial fishing lure of claim 1, further comprising an air material positioned within the cavity.

14. The artificial fishing lure of claim 1, further comprising at least one plug removably positioned in the at least one hole.

15. The artificial fishing lure of claim 1, wherein the sleeve contains at least one partition positioned in the cavity.

16. The artificial fishing lure of claim 15, wherein the at least one partition of the sleeve further comprises at least two partitions forming at least a second cavity and having at least one flap covering the second cavity.

17. A system, comprising:
a plurality of interchangeable artificial lure heads being integral with respective artificial lure rears and bodies, wherein the bodies are between the artificial lure heads and artificial lure rears;

a plurality of interchangeable sleeves for the artificial lure heads and being separate elements and removable from the artificial heads, each of the plurality of interchangeable sleeves having a front and a circumscribing wall extending therefrom to form an opening, the wall removably extendable over any selected artificial lure head of the artificial lure heads using the opening to create a cavity between the front and the selected artificial lure head, and at least one hole through the circumscribing wall at a location that allows communication between the cavity and an environment exterior of the sleeve, wherein, in response to the wall of a selected sleeve being removably mounted over the selected artificial lure head:

the selected sleeve elastically constricts around the selected artificial lure head to hold the selected sleeve thereto with a removable friction fit between the selected head and the wall within the opening such that the respective artificial lure rear and body integral with the selected artificial lure head extend outwardly from the opening of the selected sleeve in a direction away from the front of the selected sleeve;

a scent material is dynamically inserted by a user between the selected sleeve and the selected artificial lure head into the cavity;

the scent material is gradually released from under the elastically constricted selected sleeve; and the interchangeable artificial lure heads and the interchangeable sleeves comprising one or more of a different color, shape, material, size, elasticity, flexibility, scent, and surface finish.

18. A method, comprising:
extending a circumscribing wall of a sleeve, the sleeve having a front and the circumscribing wall extending therefrom to form an opening, over an artificial lure head using the opening, to create a cavity between the front and the head such that the sleeve elastically constricts around the artificial lure head to hold the sleeve thereto with a removable friction fit between the head and the wall within the opening such that a body and rear integral to the head extend outwardly from the opening of the sleeve in a direction away from the front of the sleeve, and at least one hole through the circumscribing wall at a location that allows communication between the cavity and an environment exterior of the sleeve;

dynamically inserting a scent material between the sleeve and the head into the cavity; and gradually releasing the scent material from under the elastically constricted sleeve into surrounding water.

* * * * *